US011659789B1

(12) United States Patent
Jiang et al.

(10) Patent No.: US 11,659,789 B1
(45) Date of Patent: May 30, 2023

(54) ECOLOGICAL RESTORATION METHOD FOR LAKE WETLAND AGAINST EFFECTS OF WATER LEVEL RISE IN DRY SEASON (71) Applicant: CHANGJIANG WATER RESOURCES PROTECTION INSTITUTE, Wuhan (CN)

(72) Inventors: Bo Jiang, Wuhan (CN); Hongqing Li, Wuhan (CN); Xiaoyuan Wang, Wuhan (CN); Zhilan Liu, Wuhan (CN); Bo Cheng, Wuhan (CN); Yachun Liu, Wuhan (CN); Xue Bi, Wuhan (CN); Rongyou Chen, Wuhan (CN)

(73) Assignee: CHANGJIANG WATER RESOURCES PROTECTION INSTITUTE, Wuhan (CN)

( * ) Notice: Subject to any disclaimer, the term of this patent is extended or adjusted under 35 U.S.C. 154(b) by 0 days.

(21) Appl. No.: 17/984,256

(22) Filed: Nov. 10, 2022

(30) Foreign Application Priority Data

Nov. 19, 2021 (CN) .......................... 202111373206.5

(51) Int. Cl.
A01G 7/00 (2006.01)
G01C 13/00 (2006.01)
(Continued)

(52) U.S. Cl.
CPC .............. A01G 7/00 (2013.01); G01C 13/008 (2013.01); G06V 10/764 (2022.01); G06V 20/10 (2022.01)

(58) Field of Classification Search
CPC ........ A01G 7/00; G06V 20/10; G06V 10/764; G01C 13/008
(Continued)

(56) References Cited

FOREIGN PATENT DOCUMENTS

CN 101955261 A 1/2011
CN 102583766 A 7/2012
(Continued)

OTHER PUBLICATIONS

Liang et al., CN 103530530 A, "A Drought Lake Wetland Ecological Water Demand Quantitative Calculating Method", publish date Jan. 22, 2014 (Year: 2014).*

(Continued)

Primary Examiner — John H Le
(74) Attorney, Agent, or Firm — Bayramoglu Law Offices LLC (57) ABSTRACT An ecological restoration method for a lake wetland against effects of water level rise in a dry season includes: collecting basic data of a lake; determining wetland phytoremediation species of the lake; determining characteristic water levels of the lake under a baseline scenario and under different water level rise scenarios; determining a restoration range based on wetland types corresponding to different characteristic water levels; selecting an experimental restoration area from the restoration range, and performing ecological restoration; and monitoring a plant community state and waterbird biodiversity, judging whether the restoration reaches a preset goal, and adjusting the method if the restoration does not reach the preset goal. According to the method, the effects of water level rise in the dry season on wetland habitat, biodiversity, ecosystem services and the like can be relieved to the greatest extent, so that an ecological restoration effect of the lake wetland is improved.

9 Claims, 5 Drawing Sheets (51) Int. Cl.
*G06V 20/10* (2022.01)
*G06V 10/764* (2022.01)

(58) Field of Classification Search
USPC .............................................. 702/5
See application file for complete search history.

(56) References Cited

FOREIGN PATENT DOCUMENTS

| CN | 102776866 A | 11/2012 |
|----|-------------|---------|
| CN | 113011740 A | 6/2021  |
| CN | 113269362 A | 8/2021  |

OTHER PUBLICATIONS

Li Yingxi, et al., Research on Ecuador's national water resources conservation plan, Yangtze River, 2017, pp. 78-83,96, vol. 48, No. 22.

Li Hongqing, et al., The responding relationship between water levels in dry season and wetlands ecology of the Poyang Lake, Water Ecological Civilization Forum, 2018, pp. 23-26.

Xin Gao, et al., An evolutionary game analysis of governments' decision-making behaviors and factors influencing watershed ecological compensation in China, Journal of Environmental Management, 2019, pp. 1-19, vol. 251, 109592.

Yao Xin, et al., Impact of water level change on wetland vegetation of rivers and lakes, Journal of Lake Sciences, 2014, pp. 813-821, vol. 26, vol. 6.

Feng Chengting, et al., Discussion on Biomass Allocation of Submerged Plants in Landscape Water Ecological Restoration, Chinese Garden, 2019, pp. 117-121, vol. 35, No. 5.

\* cited by examiner

ECOLOGICAL RESTORATION METHOD FOR LAKE WETLAND AGAINST EFFECTS OF WATER LEVEL RISE IN DRY SEASON

CROSS REFERENCE TO THE RELATED APPLICATIONS

This application is based upon and claims priority to Chinese Patent Application No. 202111373206.5, filed on Nov. 19, 2021, the entire contents of which are incorporated herein by reference.

TECHNICAL FIELD

The present invention relates to the technical field of ecological restoration engineering, and more particularly, to an ecological restoration method for a lake wetland against the effects of water level rise in a dry season.

BACKGROUND

With the rapid development of society and economy and the intensification of human activities, the ecological environments of lake wetlands face severe situations. Ecological and environmental problems such as lake wetland shrinking, habitat degradation, diversity reduction, and stability reduction are widespread. Variations in the hydrological rhythm of lake wetlands under changing environments are important stressors that aggravate the above problems. The water level change is one of the key factors that affect the ecological and hydrological process of lake wetlands, and also one of the main environmental factors that directly or indirectly affect physical forms of lake wetlands, wetland habitats, wetland biodiversity and wetland ecosystem services, and the like[1]. At present, the ecological restoration of lakes in China is mainly directed to the water pollution control[2], and the ecological restoration of lake wetlands is mostly aimed at damaged lakes. None of the existing ecological restoration methods for lake wetlands can alleviate the effects of water level rise on wetland habitats, biodiversity and ecosystem services during dry seasons.

The references involved in this document include:

Yao Xin, Yang Guishan, Wan Rongrong, et al. "Impact of water level change on wetland vegetation of rivers and lakes", [J]. Journal of Lake Sciences, 2014, 26(6): 813-821.

Feng Chengting, Zhao Qiangmin, Gan Meina, "Discussion on Biomass Allocation of Submerged Plants in Landscape Water Ecological Restoration", [J]. Chinese Landscape Architecture, 2019, 35(5):117-121.

SUMMARY

An object of the present invention is to provide an ecological restoration method for a lake wetland against the effects of water level rise in a dry season.

Unlike the existing ecological restoration for lake wetlands, which only focuses on a single fixed scenario and a single technical method for damaged lake wetlands, the method of the present invention implements the ecological restoration for the lake wetland in a targeted manner in consideration of ecological characteristics of the lake wetland, long-time sequenced water level data, and water transfer capacity requirements of water diversion projects, which can minimize the effects of water level rise on wetland habitats, biodiversity, ecosystem services and the like during the dry season, and thus is of great significance for maintaining the ecological balance and regulating the structure, process and function of wetland ecosystems.

In order to solve the above technical problems, the present invention adopts the following technical solutions.

An ecological restoration method for a lake wetland against the effects of water level rise in a dry season includes the following steps:

a first step, collecting basic data of a target lake, the basic data comprising long-time sequenced water level observation data of a representative water level station of the lake, survey data of a wetland plant community in different periods, survey data of a structure and feeding habit characteristics of a wetland waterbird community, high-resolution remote sensing image data, and lake terrain data;

a second step, determining wetland phytoremediation species of the target lake based on the survey data of the wetland plant community in different periods, and the survey data of the structure and feeding habit characteristics of the wetland waterbird community;

a third step, calculating an average water level of the target lake in the driest months for many years based on the long-time sequenced water level observation data, as a characteristic water level under a baseline scenario; determining characteristic water levels of the target lake under different water level rise scenarios in the dry season according to an overall water transfer scale of a water diversion project and different water transfer requirements of the target lake;

a fourth step, matching the long-time sequenced water level observation data and the high-resolution remote sensing image data based on a date, filtering out the high-resolution remote sensing image data corresponding to different characteristic water levels, interpreting the high-resolution remote sensing image data using a decision tree classification method to acquire a wetland type classification result corresponding to the respective characteristic water levels, and determining a restoration range, wherein said determining the restoration range comprises: taking areas, that are herbaceous swamps or mudflats under the baseline scenario and are all water areas under different water level rise scenarios in the dry season, as possible restoration ranges; and determining the restoration range from the possible restoration ranges in consideration of the integrity and connectivity of the restoration range, the degree of fusion with a surrounding terrain, the maintenance of a reasonable distance from villages and towns, and the coordination of construction content related to the overall wetland planning of the target lake;

a fifth step, selecting an experimental restoration area from the restoration range, and performing ecological restoration on the experimental restoration area, the ecological restoration comprising micro-topographic transformation and phytoremediation; and selecting the phytoremediation for the experimental remediation area from the phytoremediation species determined in the second step; and a sixth step, monitoring a plant community state and waterbird biodiversity of the experimental restoration area, judging whether the plant community state and the waterbird biodiversity reach a preset goal or not, and applying the current ecological restoration method of the experimental restoration area to other restoration ranges if the plant community state and the waterbird biodiversity reach the preset goal; and if the plant community state and the waterbird biodiversity do not reach the preset goal, adjusting the micro-topographic transformation and phytoremediation used in the experimental restoration area until the preset goal is reached, and then applying the ecological restoration method to other restoration ranges.

In some specific implementations, the second step specifically includes:

determining plant dominant species in the target lake wetland based on the survey data of the wetland plant community in different periods; determining feeding habit preferences and habitat characteristics of waterbirds during a wintering period based on the survey data of the structure and feeding habit characteristics of the wetland waterbird community in different periods; and determining phytoremediation species in the target lake wetland in consideration of the plant dominant species, as well as the feeding habit preferences and habitat characteristics of waterbirds.

In some specific implementations, in the third step, control water levels during wintering periods of migratory birds in Caizi Lake in 2030 and 2040 after the operation of a "Diversion of Water from Changjiang River (also known as the Yangtze River) to Huaihe River" project are respectively used as the characteristic water levels of the target lake under different water level rise scenarios in the dry season.

In some specific implementations, the wetland types in the fourth step include water bodies, mudflats, herbaceous swamps, paddy fields, woodlands and construction land.

In some specific implementations, the micro-topographic transformation described in the fifth step includes:

performing DEM modeling on the experimental restoration area to obtain terrain elevation data of the experimental restoration area; and padding, based on the terrain elevation data, areas where beach land cannot be exposed or a shallow water body cannot be maintained under different water level rise scenarios in the dry season, such that the experimental restoration area after padding meets the exposure of the beach land or the maintenance of the shallow water body under different water level rise scenarios in the dry season.

In some specific implementations, the micro-topographic transformation is performed in consideration of the degree of fusion of the experimental restoration area after transformation with the surrounding terrain, and an original overall topographic structure of the experimental restoration area, such that after the micro-topographic transformation, a design elevation of an area with a relatively high original terrain is still relatively high, and a design elevation of an area with a relatively low original terrain is still relatively low.

In some specific implementations, the phytoremediation described in the fifth step includes:

(1) determining species of wetland plants, which are suitable to be planted in the experimental restoration area, from phytoremediation species determined in the second step by integrating the terrain elevation data of the experimental restoration area after the micro-topographic transformation, a suitable water depth for the phytoremediation species determined in the second step, and the characteristic water levels determined in the third step; and (2) determining a planting scale and proportion and a planting and sowing mode in consideration of the characteristics of the wetland plant species determined in the step (1), the terrain elevation data of the experimental restoration area after transformation, and the characteristic water levels determined in the third step, and then performing planting and sowing.

In some specific implementations, the plant community state in the sixth step includes at least a survival status, height and coverage of plants.

In some specific implementations, the preset goal in the sixth step spans 5 years, which takes a current status of wetland plants and wetland waterbirds in the target lake as a reference system, or takes an area where ecological restoration has not been implemented in the target lake as a reference area; and the preset goal is reached if the ecological improvement of the experimental restoration area meets expectations relative to the relative reference system or reference area.

The present invention has the following advantages and beneficial effects.

The current ecological restoration for lake wetlands generally only restores damaged lakes, without considering the effects of water level rise on the ecological and hydrological processes of the lake wetlands during dry seasons. The method of the present invention effectively integrates the water level changes in a dry season and ecological restoration of a lake wetland, and proposes an ecological restoration method for a lake wetland against the effects of water level rise in a dry season. According to the method of the present invention, the effects of water level rise in the dry season on wetland habitat, biodiversity, ecosystem services and the like can be relieved to the greatest extent, and the ecological restoration effect of the lake wetland can be further improved. Therefore, the method of the present invention is of great significance for maintaining the ecological balance of the lake wetland and improving the structure, process and function of the wetland ecosystem.

DETAILED DESCRIPTION OF THE EMBODIMENTS

In order for a person skilled in the art to better understand the present invention, the specific implementations of the technical solutions of the present invention will be described clearly and completely below. Obviously, the following descriptions are only specific implementations, and are not intended to limit the protection scope of the present invention.

The foregoing descriptions are merely preferred embodiments of the present invention, and are not intended to limit the present invention. Within the spirit and principles of the present invention, any transformations, equivalent substitutions, improvements, etc., are within the protection scope of the present invention.

The specific implementation process of the method of the present invention will be described in detail below with reference to the embodiments. The specific implementation process includes a pre-restoration implementation stage, a restoration implementation stage, and a post-restoration implementation stage. The pre-restoration implementation stage mainly includes basic data collection and data analysis. The restoration implementation stage mainly includes micro-topographic transformation and phytoremediation. The post-restoration implementation stage mainly includes restoration effect monitoring.

Figure 1:
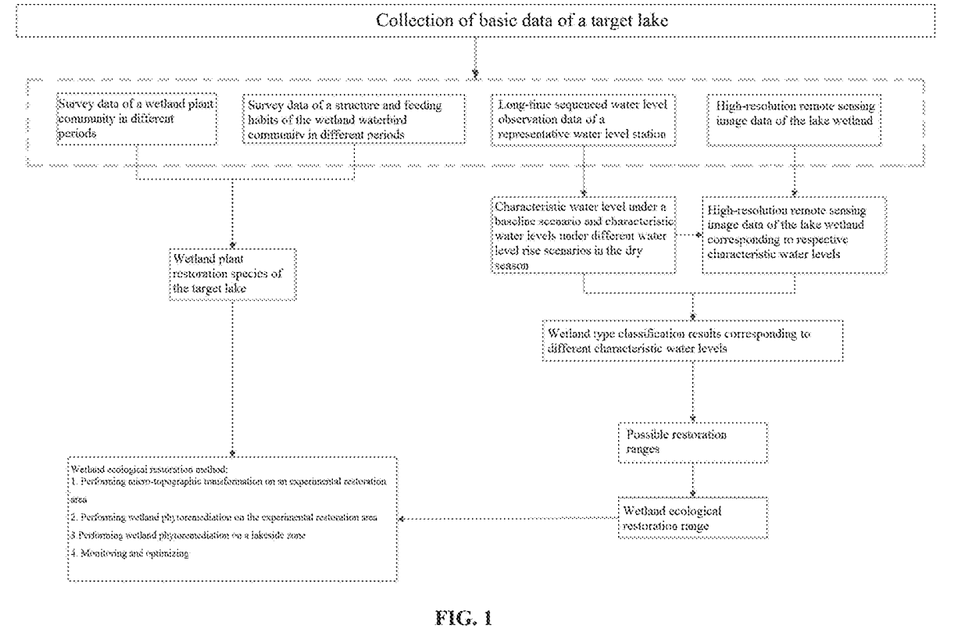
FIG. 1 is a flowchart of a specific implementation of the present invention.

In this embodiment, Caizi Lake is taken as a target lake. A specific flowchart of an ecological restoration method for a lake wetland in this embodiment is shown in FIG. 1. The method includes the following specific steps.

In the first step, basic data of the target lake is collected.

Specifically, the basic data includes long-time sequenced water level observation data WL of a representative water level station of the lake, survey data Vegetation of a wetland plant community in different periods, survey data Bird of a structure and feeding habit characteristics of a wetland waterbird community in different periods, and high-resolution remote sensing image data Image of the lake wetland. The above basic data are all basic data of the target lake.

In this specific implementation, the long-time sequenced water-level observation data of the representative water level station of the lake is long-time sequenced daily water level data measured by the representative water level station. The survey data of the wetland plant community includes a composition of wetland plant species, wetland vegetation types and distribution, main wetland vegetation distribution pattern characteristics, wetland plant phenology and the like in different periods. The survey data of the structure and feeding habit characteristics of the wetland waterbird community include survey data such as species composition, spatial distribution, and feeding habit characteristics of wetland waterbird during a wintering period. Multi-source heterogeneous remote sensing image data is used as the high-resolution remote sensing image data of the lake wetland.

In the second step, plant dominant species in the target lake wetland are determined based on the survey data of the wetland plant community in different periods; feeding habit preferences and habitat characteristics of waterbirds during a wintering period are determined based on the survey data of the structures and feeding habit characteristics of the wetland waterbird community in different periods; and phytoremediation species in the target lake wetland are determined in consideration of the plant dominant species, as well as the feeding habit preferences and habitat characteristics of waterbirds.

In this embodiment, the determined wetland phytoremediation species of the target lake include submerged plants, root floating-leaved plants, emergent plants, and hygrophyte. The submerged plants further include. *Vallisneria natans, Hydrilla verticillata, Potamogeton wrightii, Ceratophyllum demersum, Potamogeton crispus, Najas marina,* and *Myriophyllum spicatum.*

The root floating-leaved plants further include: *Trapa bispinosa, Trapa quadrispinosa, Nymphoides peltatum,* and *Euryale ferox.* The emergent plants further include *Phragmites communis, Zizania latifolia,* Polygonumorientale, and *Polygonum lapathifolium.* The hygrophyte further includes Carexthunbergii, *Ranunculus polii, Potentilla supina,* and *Cynodon dactylon.*

In the third step, characteristic water levels of the target lake under a baseline scenario and under different water level rise scenarios in the dry season are determined respectively based on the long-time sequenced water level observation data and water transfer requirements of the target lake. Specifically, an average water level of the target lake in the driest months for many years (generally, an average water level of the driest months in the past 50 years) is calculated according to the long-time sequenced water level observation data WL, denoted as WL1, i.e., the characteristic water level under the baseline scenario. Characteristic water levels of the target lake under different water level rise scenarios in the dry season, denoted as WL2 and WL3 respectively, are determined according to an overall water transfer scale of a water diversion project and water transfer requirements of the target lake. In this embodiment, control water levels during wintering periods of migratory birds in the Caizi Lake in 2030 and 2040 after the operation of a "Diversion of Water from Changjiang River to Huaihe River" project are respectively used as WL2 and WL3. WL1, WL2, and WL3 determined in this embodiment are 6.87 m, 7.50 m, and 8.10 m, respectively.

In the fourth step, the long-time sequenced water level observation data and the high-resolution remote sensing image data are matched based on a date, the high-resolution remote sensing image data corresponding to different characteristic water levels determined in the third step are filtered out, the high-resolution remote sensing image data are interpreted using a decision tree classification method to acquire a wetland type classification result corresponding to respective characteristic water levels, and a restoration range is determined in combination with terrain data of the lake.

Specifically, the long-time sequenced water level observation data WL of the target lake and the high-resolution remote sensing image data Image are matched based on a date; and high-resolution remote sensing image data corresponding to characteristic water levels WL1, WL2 and WL3 or adjacent water levels are filtered out, denoted as Image 1, Image 2 and Image 3 respectively, wherein Image1, Image2 and Image3 can represent the high-resolution remote sensing image data corresponding to the baseline scenario and different water level rise scenarios in the dry season. The remote sensing images Image1, Image2 and Image3 are interpreted using the decision tree classification method to obtain wetland type classification results under respective characteristic water levels, the wetland type classification results including area and spatial distribution data of each wetland type. Wetland types are pre-defined artificially. The wetland types defined in this embodiment include water bodies, mudflats, herbaceous swamps, paddy fields, woodlands and construction land.

Figure 2A:
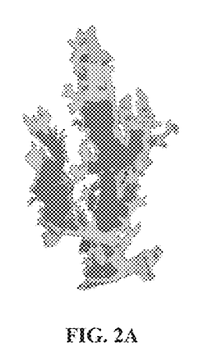
FIGS. 2A-2C show wetland type classification data corresponding to different characteristic water levels according to an embodiment.
Figure 2B:
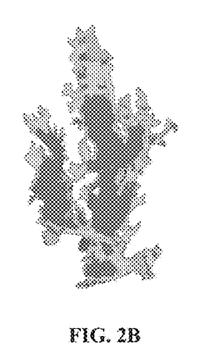
Figure 2C:
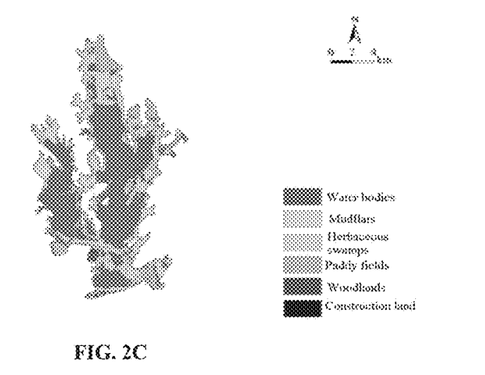

FIGS. 2A-2C show wetland type classification results corresponding to respective characteristic water levels in this embodiment, wherein FIGS. 2A-2C show the wetland type classification results corresponding to the characteristic water levels WL1, WL2, and WL3, respectively, wherein the corresponding characteristic water levels are 6.97 m, 7.50 m and 8.10 m. In this embodiment, different colors are used to represent different wetland types.

After the wetland type classification results are obtained, the restoration scope of the target lake is determined in combination with the terrain data DEM of the lake. Firstly, possible restoration ranges are determined, wherein the restoration range should be included in the possible restoration ranges. The possible restoration ranges are: areas which are (1) herbaceous swamps or mudflats under the baseline scenario; and (2) water bodies under the water level rise scenario in the dry season. In this embodiment, the possible restoration ranges should be: areas which are (1) herbaceous swamps or mudflats under the water level WL1; and (2) water bodies under the water levels WL2 and WL3. Then, the wetland ecological restoration range of the target lake is determined from the possible restoration ranges in consideration of the integrity and connectivity of the restoration range, the degree of fusion with a surrounding terrain, the maintenance of a reasonable distance from villages and towns, and the coordination of construction content related to the overall wetland planning of the target lake.

In the fifth step, an experimental restoration area is selected from the restoration range, and an ecological restoration is performed on the experimental restoration area, the ecological restoration including micro-topographic transformation and phytoremediation.

According to the method of the present invention, the experimental restoration area is manually selected according to experiences. In this embodiment, considering the environmental sensitivity of the restoration range and the effects of the water level rise in the dry season, the determined experimental restoration area is shown in Area 1, Area 2, and Area 3 in FIG. 3.

Specifically, the performing the micro-topographic transformation on the experimental restoration area includes the following steps.

(1): DEM modeling is performed on the experimental restoration area to acquire a terrain distribution of the experimental restoration area.

Figure 4:
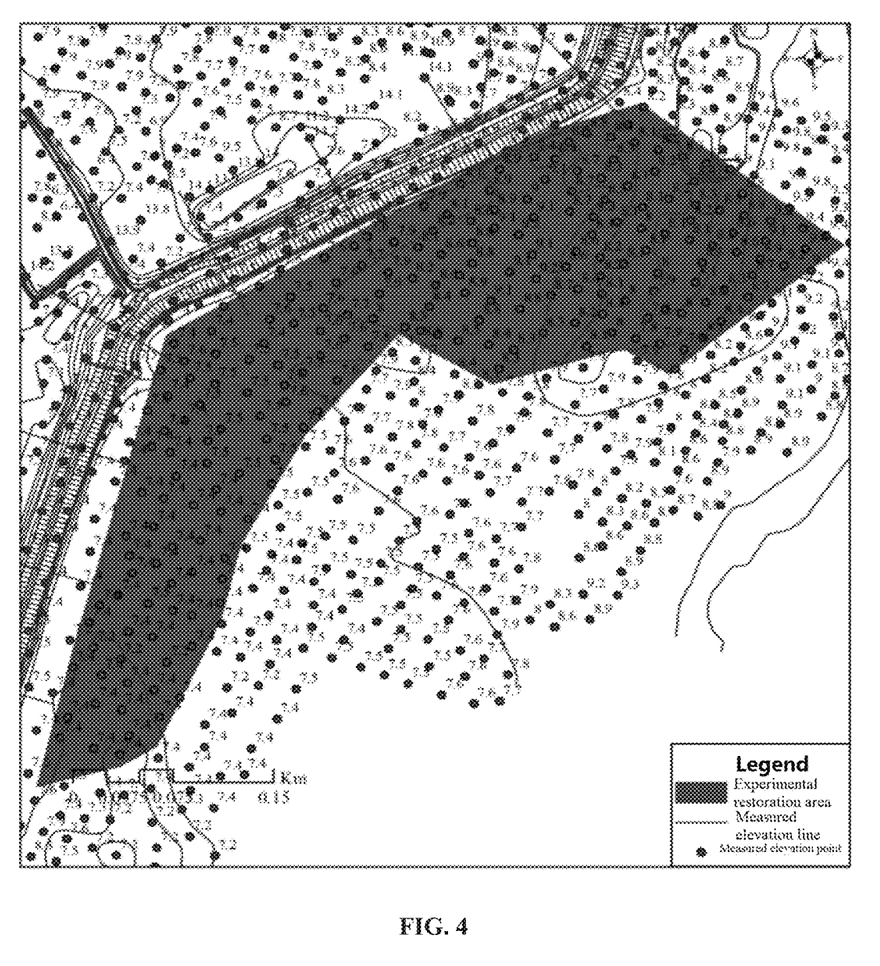
FIG. 4 is a topographic map of an experimental restoration area according to an embodiment.

In this embodiment, a 1:1000 topographic map of the experimental restoration area is measured by an unmanned aerial vehicle (UAV) to acquire flight elevation point data, as shown in FIG. 4. The elevation point data is used for DEM modeling to generate contour data of the experimental restoration area, as shown by a thin line in FIG. 5, and to acquire an experimental restoration area DEM, as shown in an area enclosed by a thick line in FIG. 5.

As a preferred scheme, in order to ensure that a surveying and mapping range of the UAV can cover the experimental restoration area, the experimental restoration area is expanded by 150 m as a surveying and mapping range prior to the 1:1000 topographic surveying and mapping, and a cross-section is measured every 100 m. If there are special terrains such as undulations or turns, sections need to be densified appropriately.

(2): The micro-topographic transformation is performed on the experimental restoration area.

Figure 3:
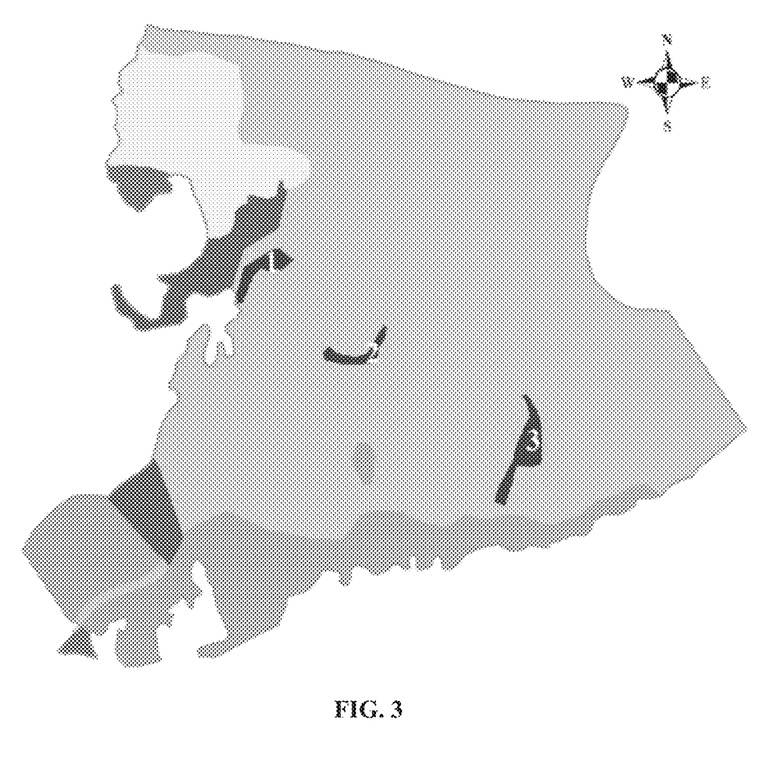
FIG. 3 is an experimental restoration area determined according to an embodiment.
Figure 5:
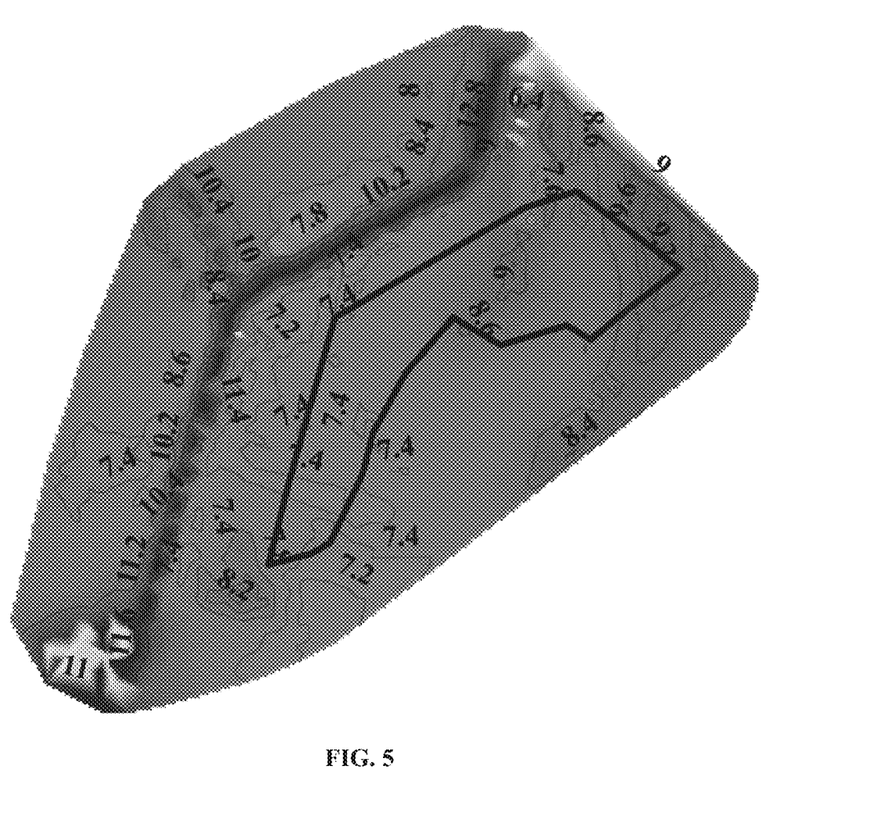
FIG. 5 shows topographic contours of an experimental restoration area according to an embodiment.

As shown in FIG. 5, it can be seen that an overall terrain elevation of a northeastern part in the experimental restoration area shown in Area 1 in FIG. 3 is basically greater than 7.9 m, which can meet the needs that a beach land is exposed or a shallow water body is maintained under the characteristic water levels WL2 and WL3 at the same time. The shallow water body refers to a water body with a depth of less than 0.5 m. An overall terrain elevation of a southwest part in the experimental restoration area is substantially 7.4 m to 7.9 m, which can meet the needs that a beach land is exposed or a shallow water body is maintained under the water level WL2, but the process of exposing the beach land cannot be completed in some areas, which causes certain adverse effects on waterbirds that take herbaceous swamps, mudflats or shallow water areas as feeding substrates, and take food by digging and pecking, or by immersing the heads into water or by picking up.

During the micro-topographic transformation, it is necessary to create a variety of gentle slope terrains as much as possible. A step elevation method can be used to pad the southwest part, with a height of the padding not exceeding 60 cm. In addition, the experimental restoration area after padding should be able to meet the beach land exposure process under different water level rise scenarios in the dry season. In this embodiment, in order to meet this requirement, the overall elevation of the experimental restoration area should be maintained at 7.4 m to 9.4 m after padding.

Figure 6:
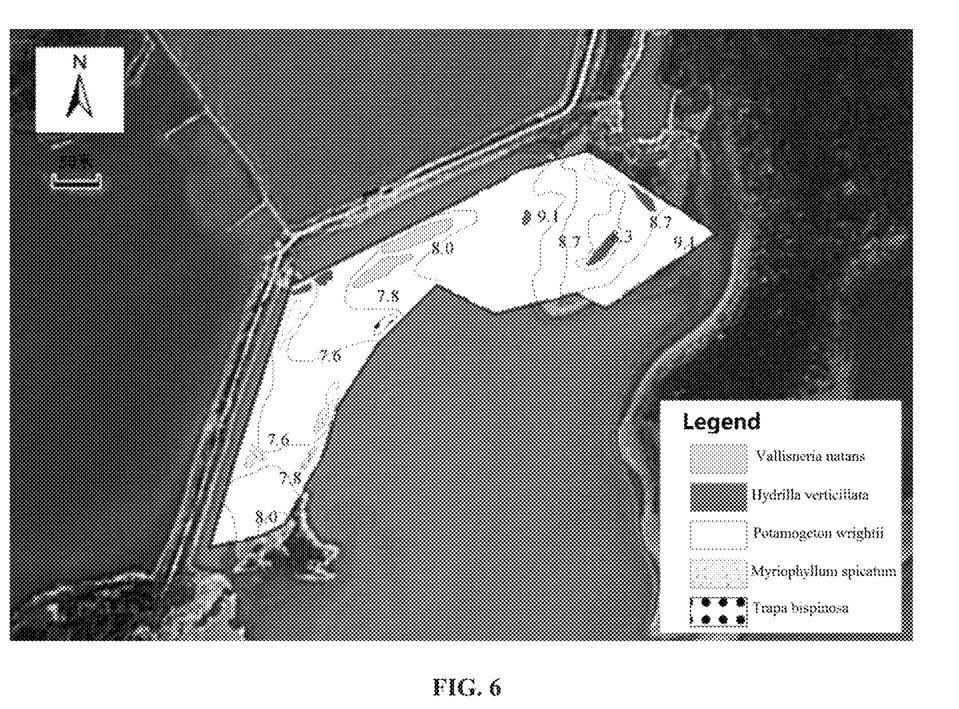
FIG. 6 shows results of micro-topographic transformation and plant configuration of an experimental restoration area according to an embodiment.

In addition, the micro-topographic transformation should be performed in consideration of the degree of fusion of the transformed terrain with a surrounding terrain, and an original overall topographic structure of the experimental restoration area, such that a design elevation of an area with a relatively high original terrain is still relatively high, and a design elevation of an area with a relatively low original terrain is still relatively low. The micro-topographic transformation result in this embodiment is shown in FIG. 6.

After the micro-topographic transformation is completed, the experimental restoration area is further subjected to construction and configuration of a plant community, in order to perform phytoremediation on the experimental restoration area. The construction and configuration of the plant community include the selection of wetland plant species, a planting scale and proportion, a planting and sowing mode, the planting and sowing density, and the planting and sowing time.

Specifically, the performing the construction and configuration of the plant community on the experimental restoration area includes the following steps.

(3): Species of wetland plants, which are suitable to be planted in the experimental restoration area, are determined from the phytoremediation species determined in the second step by integrating the characteristic water levels under different scenarios, the experimental restoration area DEM after the micro-topographic transformation, and a suitable water depth for the phytoremediation species determined in the second step.

(4): The planting scale and proportion and the planting and sowing mode of plants in the experimental restoration area are determined according to the characteristics of dominant species, micro-topography after reconstruction, water levels under different scenarios, suitable water depths of main aquatic plants and common aquatic plant reproduction methods. Further, the planting and sowing mode in the experimental restoration area is determined according to common aquatic plant reproduction methods. Further, the planting and sowing time of aquatic plants in the experimental restoration area is about 15 days before and after April 5.

Taking the experimental restoration area shown in FIG. 3 as an example, a configuration method of aquatic plants in the experimental restoration area shown in Area 1 in FIG. 3 is shown in FIG. 6. In order to ensure a survival rate of submerged plants to the greatest extent, and to replant in time depending on the survival of submerged plants, a suitable area is selected to build a wetland nursery (an aquatic plant planting base) for promoting the artificial planting of *Vallisneria natans, Hydrilla verticillata, Myriophyllum spicatum, Potamogeton wrightii* and the like. After submerged plants in the nursery take root, the *Vallisneria natans* is planted in the experimental restoration area by ramets, and the *Hydrilla verticillata, Myriophyllum spicatum* and *Potamogeton wrightii* are planted in a cuttage manner. The planting and sowing time is about 15 days before and after April 5.

In this embodiment, phytoremediation of a lakeside zone is also included. The construction and configuration of a plant community in the lakeside zone are mainly to construct a plant community zone composed of submerged plants, floating plants, emergent plants and hygrophyte along the lakeside zone, wherein seven submerged plants such as *Vallisneria natans, Hydrilla verticillata, Potamogeton wrightii, Ceratophyllum demersum, Potamogeton crispus, Najas marina* and *Myriophyllum spicatum*, four emergent plants such as *Phragmites communis, Zizania latifolia,*

Polygonumorientale and *Polygonum lapathifolium*, three root floating-leaved plants such as *Nymphoides peltatum, Euryale ferox* and *Trapa quadrispinosa*, and three hygrophyte such as Carexthunbergii, *Potentilla supina* and *Ranunculus polii* are mainly selected.

Seeds of aquatic plants are sprayed or seedling lumps are planted in the restoration area by means of spraying, cuttage, transplanting or other ways, according to a water level and a corresponding water depth in the restoration area of the lakeside zone. Submerged plants are recovered by spraying, seedling cultivation or other ways. The submerged plant *Najas marina* and the root floating-leaved plant *Trapa quadrispinosa* are planted in a range of elevation of 7.0 m to 8.1 m in time; the submerged plants such as *Hydrilla verticillata, Potamogeton crispus, Myriophyllum spicatum* and *Potamogeton wrightii* and the root floating-leaved plants such as *Nymphoides peltatum* and *Trapa quadrispinosa* are planted in a range of elevation of 8.1 m to 8.5 m in time, the submerged plant *Vallisneria natans* and the root floating-leaved plant *Euryale ferox* are planted in a range of elevation of 8.5 m to 9.4 m in time; and a plant community zone composed of the emergent plants such as *Phragmites communis*, *Zizania latifolia*, Polygonumorientale and *Polygonum lapathifolium* and the hygrophyte such as Carexthunbergii, *Potentilla supina* and *Ranunculus polii* is constructed along an elevation gradient in a range of elevation of above 9.4 m.

In the sixth step, an ecological restoration effect of the experimental restoration area is monitored, and optimization is performed based on the ecological restoration effect.

The specific implementation process of this step includes the following steps.

(1): A plant community state and waterbird biodiversity in the experimental restoration area are monitored dynamically.

The plant community state includes at least a survival status, height and coverage of plants, and the waterbird biodiversity at least includes a structure and spatial distribution of a waterbird community. Specifically, monitoring points are arranged in the experimental restoration area and the lakeside zone, and the survival state, height and coverage of plants in the experimental restoration area and the lakeside zone, as well as the structure and spatial distribution of the waterbird community are monitored and evaluated dynamically. In this embodiment, monitoring points are also arranged in a restoration area where ecological restoration has not been implemented.

(2): A preset goal of ecological restoration is determined.

Firstly, a reference system or reference area is determined. Specifically, in the preset goal, the current status of wetland plants and wetland waterbirds in the target lake is used as the reference system, or an area where ecological restoration has not been implemented in the target lake is used as the reference area. The time length is nearly 5 years. In this embodiment, the current status of wetland plants and wetland waterbirds refers to surveys on the states of wetland plant communities and the biodiversity of waterbirds in the past two years. If the ecology of the experimental restoration area is significantly improved relative to the reference system or reference area, the preset goal is reached.

In addition, an ideal goal is also set in this embodiment, wherein the restoration of plant communities and waterbird biodiversity to a historical optimum state is taken as the reference system, and the time length is 30 years.

(3). Whether the ecological restoration effect has reached the preset goal is determined according to the monitoring data, wherein the current ecological restoration method for the experimental restoration area does not need to be optimized if the preset goal is reached, and the micro-topographic transformation and phytoremediation of the experimental restoration area need to be adjusted if the preset goal is not reached, until the preset goal is reached.

The foregoing descriptions are merely preferred embodiments of the present invention, and are not intended to limit the present invention. Any modifications, equivalent substitutions, improvements, etc., fall within the protection scope of the present invention without departing from the spirit and principles of the present invention.

What is claimed is:

1. An ecological restoration method for a lake wetland against effects of a water level rise in a dry season, comprising the following steps:
    a first step: collecting basic data of a target lake, the basic data comprising long-time sequenced water level observation data of a representative water level station of the target lake, survey data of a wetland plant community in different periods, survey data of a structure and feeding habit characteristics of a wetland waterbird community, high-resolution remote sensing image data, and lake terrain data;
    a second step: determining wetland phytoremediation species of the target lake based on the survey data of the wetland plant community in the different periods and the survey data of the structure and the feeding habit characteristics of the wetland waterbird community;
    a third step: calculating an average water level of the target lake in driest months for many years based on the long-time sequenced water level observation data as a first characteristic water level under a baseline scenario; determining second characteristic water levels of the target lake under different water level rise scenarios in the dry season according to an overall water transfer scale of a water diversion project and different water transfer requirements of the target lake;
    a fourth step: matching the long-time sequenced water level observation data and the high-resolution remote sensing image data based on a date, filtering out the high-resolution remote sensing image data corresponding to different characteristic water levels, interpreting the high-resolution remote sensing image data using a decision tree classification method to acquire a wetland type classification result corresponding to each of the different characteristic water levels, and determining a restoration range, wherein
    said determining the restoration range comprises: taking herbaceous swamps or mudflats under the baseline scenario and all water areas under the different water level rise scenarios in the dry season as possible restoration ranges; and determining the restoration range from the possible restoration ranges in a consideration of an integrity and a connectivity of the restoration range, a degree of a fusion with a surrounding terrain, a maintenance of a reasonable distance from villages and towns, and a coordination of a construction content related to an overall wetland planning of the target lake;
    a fifth step: selecting an experimental restoration area from the restoration range, and performing an ecological restoration on the experimental restoration area, the ecological restoration comprising a micro-topographic transformation and a phytoremediation; and
    selecting the phytoremediation for the experimental restoration area from the wetland phytoremediation species determined in the second step; and a sixth step: monitoring a plant community state and a waterbird biodiversity of the experimental restoration area, judging whether the plant community state and the waterbird biodiversity reach a preset goal or not, and applying the ecological restoration method of the experimental restoration area to other restoration ranges if the plant community state and the waterbird biodiversity reach the preset goal; and if the plant community state and the waterbird biodiversity do not reach the preset goal, adjusting the micro-topographic transformation and the phytoremediation used in the experimental restoration area until the preset goal is reached, and then applying the ecological restoration method to the other restoration ranges.

2. The ecological restoration method for the lake wetland against the effects of the water level rise in the dry season according to claim 1, wherein:
the second step specifically comprises:
determining plant dominant species in the lake wetland of the target lake based on the survey data of the wetland plant community in the different periods; determining feeding habit preferences and habitat characteristics of waterbirds during a wintering period based on the survey data of the structure and the feeding habit characteristics of the wetland waterbird community in the different periods; and determining the wetland phytoremediation species in the lake wetland of the target lake in a consideration of the plant dominant species, as well as the feeding habit preferences and the habitat characteristics of the waterbirds.

3. The ecological restoration method for the lake wetland against the effects of the water level rise in the dry season according to claim 1, wherein:
in the third step, controlling water levels during a wintering period of migratory birds in Caizi Lake in 2030 and 2040 after an operation of a "Diversion of Water from Changjiang River to Huaihe River" project are respectively used as the second characteristic water levels of the target lake under the different water level rise scenarios in the dry season.

4. The ecological restoration method for the lake wetland against the effects of the water level rise in the dry season according to claim 1, wherein:
a wetland type in the fourth step comprises water bodies, the mudflats, the herbaceous swamps, paddy fields, woodlands, and a construction land.

5. The ecological restoration method for the lake wetland against the effects of the water level rise in the dry season according to claim 1, wherein:
the micro-topographic transformation described in the fifth step comprises:
performing a DEM modeling on the experimental restoration area to obtain terrain elevation data of the experimental restoration area; and
padding, based on the terrain elevation data, areas where a beach land cannot be exposed or a shallow water body cannot be maintained under the different water level rise scenarios in the dry season such that the experimental restoration area after the padding meets an exposure of the beach land or a maintenance of the shallow water body under the different water level rise scenarios in the dry season.

6. The ecological restoration method for the lake wetland against the effects of the water level rise in the dry season according to claim 5, wherein:
the micro-topographic transformation is performed in a consideration of a degree of a fusion of the experimental restoration area after the micro-topographic transformation with the surrounding terrain and an original overall topographic structure of the experimental restoration area, such that after the micro-topographic transformation, a design elevation of an area with a relatively high original terrain is still relatively high, and a design elevation of an area with a relatively low original terrain is still relatively low.

7. The ecological restoration method for the lake wetland against the effects of the water level rise in the dry season according to claim 1, wherein:
the phytoremediation in the fifth step comprises:
step (1): determining species of wetland plants from the wetland phytoremediation species determined in the second step by integrating terrain elevation data of the experimental restoration area after the micro-topographic transformation, a suitable water depth for the wetland phytoremediation species determined in the second step, and the second characteristic water levels determined in the third step, wherein the species of the wetland plants are suitable to be planted in the experimental restoration area; and
step (2): determining a planting scale, a proportion, and a planting and sowing mode for planting and sowing in a consideration of characteristics of the species of the wetland plants determined in the step (1), the terrain elevation data of the experimental restoration area after the micro-topographic transformation, and the second characteristic water levels determined in the third step.

8. The ecological restoration method for the lake wetland against the effects of the water level rise in the dry season according to claim 1, wherein:
the plant community state in the sixth step comprises at least a survival status, a height, and a coverage of plants.

9. The ecological restoration method for the lake wetland against the effects of the water level rise in the dry season according to claim 1, wherein:
the preset goal in the sixth step spans 5 years, and the preset goal is reached if an ecological improvement of the experimental restoration area meets expectations relative to a reference system or a reference area, wherein the preset goal takes a current status of wetland plants and wetland waterbirds in the target lake as the reference system, or takes the ecological restoration not having been implemented in the target lake as the reference area.

* * * * *